United States Patent [19]
Steiner

[11] Patent Number: 4,460,055
[45] Date of Patent: Jul. 17, 1984

[54] SYSTEM TO INCREASE VEHICLE FUEL EFFICIENCY

[76] Inventor: Karl Steiner, 2719 Country La., Erie, Pa. 16506

[21] Appl. No.: 475,366

[22] Filed: Mar. 14, 1983

Related U.S. Application Data

[63] Continuation-in-part of Ser. No. 203,053, Nov. 3, 1980, Pat. No. 4,384,630.

[51] Int. Cl.³ ............................................. B62D 35/00
[52] U.S. Cl. ..................................... 180/7.1; 180/7.3; 180/7.4; 296/1 S
[58] Field of Search ................. 180/7.1, 7.3, 7.4, 68.1, 180/68.2, 68.3; 296/1 S, 91; 60/597

[56] References Cited

U.S. PATENT DOCUMENTS

| | | | |
|---|---|---|---|
| 1,322,903 | 11/1919 | Hyland | 180/7.4 |
| 1,346,993 | 7/1920 | Thompson | 180/7.4 |
| 1,934,385 | 11/1933 | Strauss | 180/68.2 |
| 2,612,964 | 10/1952 | Hobbs | 180/68.1 |
| 3,819,000 | 6/1974 | Larsen | 180/68.2 |
| 4,235,298 | 11/1980 | Sackett et al. | 180/68.3 |

FOREIGN PATENT DOCUMENTS

| | | | |
|---|---|---|---|
| 62499 | 7/1944 | Denmark | 180/68.2 |
| 602297 | 1/1932 | Fed. Rep. of Germany | 180/7.4 |
| 569546 | 4/1924 | France | 180/68.2 |

*Primary Examiner*—John A. Pekar
*Attorney, Agent, or Firm*—Wayne L. Lovercheck; Charles L. Lovercheck; Dale R. Lovercheck

[57] ABSTRACT

A duct system is disclosed for increasing the efficiency of a vehicle by decreasing the air resistance of the vehicle. The system utilizes a ducting system with a projection means at the front end and the back end of the vehicle to equalize air pressure and to decrease turbulence in areas surrounding the vehicle. Radiators heat the air within the ducting system aiding the equalizing air flow.

20 Claims, 7 Drawing Figures

SYSTEM TO INCREASE VEHICLE FUEL EFFICIENCY

CROSS REFERENCE TO RELATED APPLICATION

The present application is a continuation-in-part of co-pending application Ser. No. 203,053 filed Nov. 3, 1980 which issued as U.S. Pat. No. 4,384,630.

BACKGROUND OF THE INVENTION

This invention relates to an improved system to increase vehicle fuel efficiency having projection means isolating high pressure areas at the front of a vehicle and projection means isolating low pressure areas at the rear of the vehicle and having conduit means therebetween passing through the body and the roof of the vehicle.

Various structures have been provided to reduce turbulence and air resistance to vehicle movement but none of them have been completely satisfactory. It has been known in the art for quite some time that high pressure regions develop adjacent to a vehicle's front end and low pressure regions are created adjacent the rear end of a moving vehicle.

Various disclosures show a duct through a vehicle body; however, none have directive air channels between structurally isolated areas on a practical vehicle body. Additionally, none have provisions within such a system to make use of engine heat to increase fuel efficiency.

The following references have been noted; however, none of these references disclose the invention of applicant as disclosed herein, nor would the invention of Applicant be obvious in view of the disclosures of these references.

| | |
|---|---|
| 1,322,903 | 3,437,371 |
| 1,346,993 | 3,516,707 |
| 1,648,505 | 3,529,862 |
| 1,934,385 | 3,819,000 |
| 2,199,883 | 3,836,191 |
| 2,232,275 | 3,910,623 |
| 2,612,964 | 4,235,298 |
| 2,725,944 | Denmark 62499 |

SHORT STATEMENT OF THE INVENTION

The greatest loss of vehicle fuel efficiency results from two factors: (1) the air resistance of the vehicle and (2) poor thermal efficiency of the combustion engines used.

The system disclosed herein decreases the effective air resistance of the vehicle using ducting and projection means aided by the waste heat of the engine. As a vehicle moves through the air, areas of positive and negative air pressure are developed in front of and behind it. The system herein disclosed decreases the effective air resistance of the vehicle by isolating said areas from the ambient air and directing higher pressure air to areas of lower pressure, such movement of air being aided by the introduction of excess engine heat into the airstream. Said airstream being enclosed, turbulence is reduced and utilization of previously wasted heat is made possible. The engine's cooling fan may be used in this disclosure to further reduce the pressure differential. By ducting air from positive pressure areas to the intake area of the fan, and connecting the output of the fan to the negative pressure areas, the fan may be used to further reduce the effective air resistance of the vehicle. Projection means are provided surrounding frontal and rear areas of the vehicle surface to separate areas of pressure developed by the vehicle's movement.

If the radiator and engine are placed between the fan and its output ducts, as air is pumped through the radiator and past the engine, the air pressure developed is increased by the excess engine heat. Thus the vehicle engine is assisted. The output ducts are provided with thermal insulation to prevent the loss of heat from the system. Radiators may be positioned within the ductwork that extends generally the length of the vehicle and connected to the engine with appropriate piping to provide a path for the engine coolant. In a preferred embodiment, the radiators are positioned toward the rear of the vehicle to increase the volume of the air with the increase in temperature and thus assure a greater decrease in the pressure differential. Positioning the radiators toward the rear of the vehicle decreases noise to the passenger compartment created by the increased velocity of the air in the ducts. The increase in velocity is caused by the increase in volume resulting from the elevated temperature of the air. The positioning of the radiators toward the rear of the vehicle also eliminates any decrease of the mass of air which can pass through the ducts by increasing the air volume near the air inlets which would result in some back pressure in the duct. There is sufficient mass in the duct to prevent back flow when the radiators are positioned toward the rear of the vehicle.

It is an object of the invention to provide a vehicle body that has reduced air resistance.

It is a further object of the invention to use excess engine heat to reduce vehicular air resistance.

It is a further object of the invention is to provide an improved vehicle body.

It is a further object of the invention is to provide an improved vehicle body that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

Figure 1:
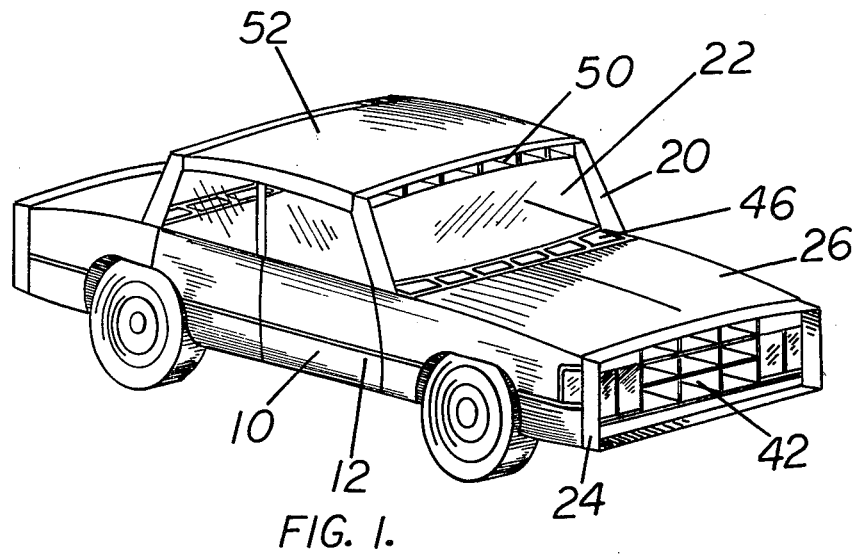
FIG. 1 is an isometric view of a preferred embodiment of the vehicle body according to the invention illustrating the front projection means and air inlets.
Figure 2:
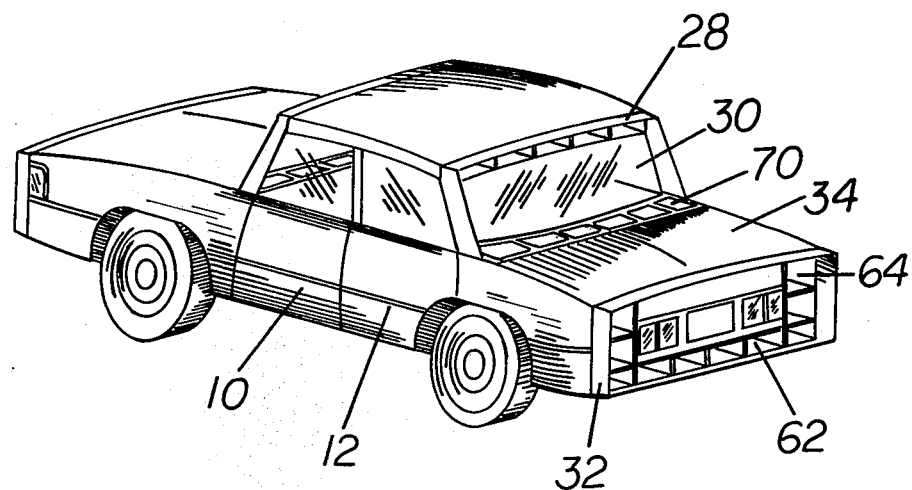
FIG. 2 is a longitudinal cross sectional side view through the vehicle body showing the duct work along the length of the vehicle body.

The preferred embodiment of the present invention is illustrated by way of example in FIGS. 1-7. With specific reference to FIGS. 1 and 2, the vehicle includes a body 10 which may be in the form of a conventional automobile 12. The body may also be in the form of a station wagon or utility vehicle as shown at 14 in FIG. 6, or in the form of a van, panel truck or bus as shown at 16 in FIG. 5, or in the form of a tractor trailer or automobile and trailer combination as shown at 18 in FIG. 7. The vehicle may be powered by a conventional internal combustion engine, by electric motor, steam engine, diesel motor or other suitable means. The vehicle body 10 is designed to increase the fuel efficiency of the automobile by decreasing the air pressure ahead of, and increasing the air pressure behind the moving vehicle. This is accomplished by providing the vehicle with means for separating the ambient air around the moving vehicle from the air in front of and behind the vehicle, means to internally direct air from high pressure areas to low pressure areas and means to heat said internal air flow. The means for separating the air zones on a typical automobile 12 may include projection means 20 surrounding an upper area or windshield 22, a projection means 24 surrounding a lower area 26 of the front end of the vehicle body, a projection means 28 surrounding an upper area or rear window 30, and a projection means 32 surrounding a trunk or lower area 34 of the rear end. The vehicle will also be provided with an engine 36 and an exhaust gas system 40. The projection means 20 surrounding the upper area or windshield 22 is constructed forwardly to separate the relatively high air pressure that is developed on the windshield from the air at lower pressure above and beside the vehicle as the vehicle moves forward. The projection means 24 surrounding the lower area 26 of the front end of the vehicle is constructed forwardly to separate the relatively high air pressure that is developed on the front end of the vehicle from the air at lower pressure above and beside the vehicle as the vehicle moves forward. The projection means 32 surrounding the trunk or lower area 3 of the rear end is constructed rearwardly to separate the relatively low air pressure that is developed on the rear end of the vehicle from the air at higher pressure above and beside the vehicle as the vehicle moves forward. The projection means 28 surrounding the upper area or rear window 30 is constructed rearwardly to separate the relatively low air pressure that is developed on the rear window from the air at higher pressure above and beside the vehicle as the vehicle moves forward.

Figure 5:
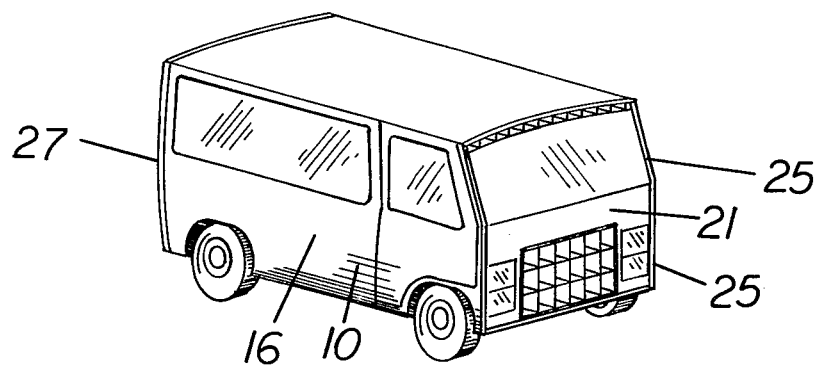
FIG. 5 is a plane view of the preferred embodiment of the invention illustrating a vehicle having a generally planar rear end.
Figure 6:
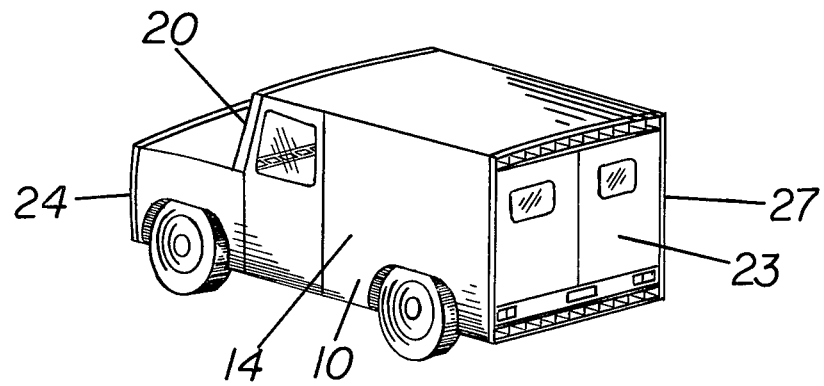
FIG. 6 is a plane view of a preferred embodiment of the invention illustrating a vehicle having a generally planar front end.

The present invention is applicable to all conventional types of vehicles as illustrated by the following examples. A vehicle may present a generally planar frontal area or front end 21 as shown in FIG. 6 and as may typically be found in a bus, van or panel truck type of vehicle. A vehicle may also present a generally planar or rear area or rear end 23 as shown in FIG. 5 as may typically be found in a station wagon or utility type vehicle. A single projection means 25 may surround the front end 21 and extend forwardly to separate the relatively high air pressure that is developed on the front end 21 from the air at lower pressure above and beside the vehicle as the vehicle moves forward. A single projection means 27 may surround the rear end 23 and extend rearwardly to separate the relatively low air pressure that is developed on the rear end 23 from the air at higher pressure above and beside the vehicle as the vehicle moves forward.

In vehicles such as vans, buses, or panel trucks, for example, which may have a generally planar front area or rear area or both, it is contemplated that the duct 52 through the roof of the vehicle and the duct 44 through the bottom of the vehicle will both be utilized to maximize the decrease of pressure in front and to maximize the increase of pressure behind the vehicle.

In another embodiment of the present invention the vehicle may be articulated such as in a tractor trailer or automobile and trailer combination. The front area may be the front end 39 of the tractor and the rear area may be the rear end of the trailer 41 in a tractor trailer combination vehicle. Flexible and detachable duct means 76 may be provided between the tractor and trailer in this embodiment.

Figure 3:
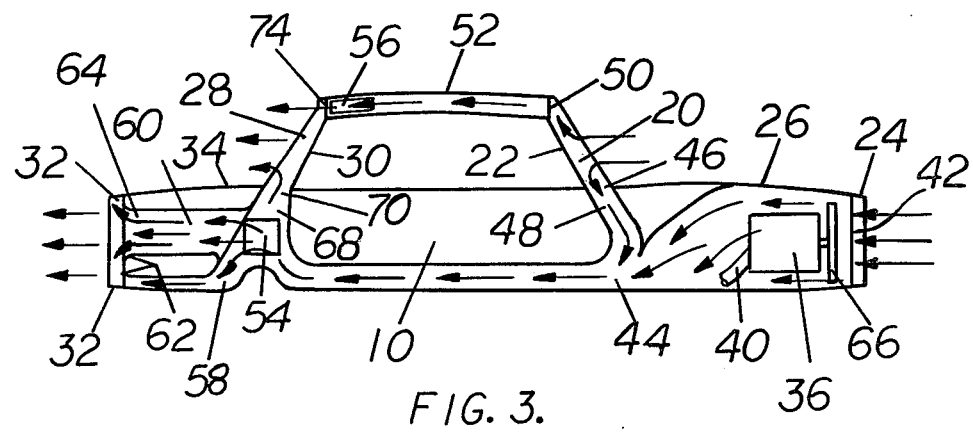
FIG. 3 is a longitudinal cross sectional view through the top of the vehicle body showing the radiators within the ducts.
Figure 4:
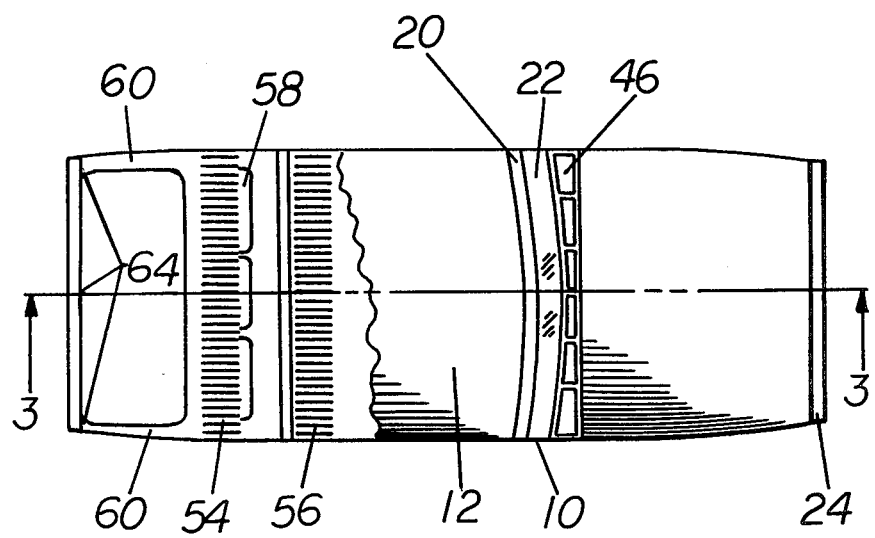
FIG. 4 shows an isometric view of a preferred embodiment of the vehicle body according to the invention illustrating the rear projection means and air inlets.

The air must remain isolated and provided with a low turbulence path as it flows from the front high pressure areas to the rear low pressure areas. As shown in FIG. 3, air at front end 26 within the projection means 24 enters air inlet 42 and is directed rearwardly through duct 44. Air at the windshield or upper area 22 within the projection means 20 may enter air inlet 46 and be directed downwardly through duct 48 and rearwardly through duct 44. Air at the windshield may also enter air inlet 50 and be directed rearwardly through duct 52. In a preferred embodiment, the ducts 44 and 52 extend generally the full width of the vehicle body. As the air moves rearwardly, it passes through radiator 54 at the rear end of duct 44 and radiator 56 at the rear end of duct 52. The radiators give up the excess heat produced by the engine 36 to the air. Since air expands when heated, a greater volume of air passes through the portion of the duct system to the rear of the radiators. From the radiator 54 the air passes rearwardly through duct 58 and duct 60 then exiting at air outlets 62 and 64 respectively adding air to the area within projection means 32 and tending to nullify the lower pressure at the rear of the vehicle. Fan 66 provides cooling air to radiator 54 when the motion of the vehicle is insufficient to provide an adequate flow of air. The exhaust gas system 40 is enclosed in said ducts, also giving up its heat to the equalizing air flow in the duct 44 before exiting.

Air also passes upwardly from the radiator 54 through duct 68 to the lower air exits 70 of the rear window 30. From the radiator 56 air flows rearwardly through duct 52 to the upper air exits 74 of the rear window 30.

Utilization of other smaller additional ducts for passenger compartment heating and/or ventilation and to various areas such as wheel wells, outside mirror, etc. may be called for upon an analysis of a given body design. The main body duct 44 and the main roof duct 52 may be insulated to reduce heat loss through the ductwork.

The fan may have variable driving means to adjust the air flow as required by vehicle speed, thermal energy developed, head or tail winds, and terrain.

Figure 7:
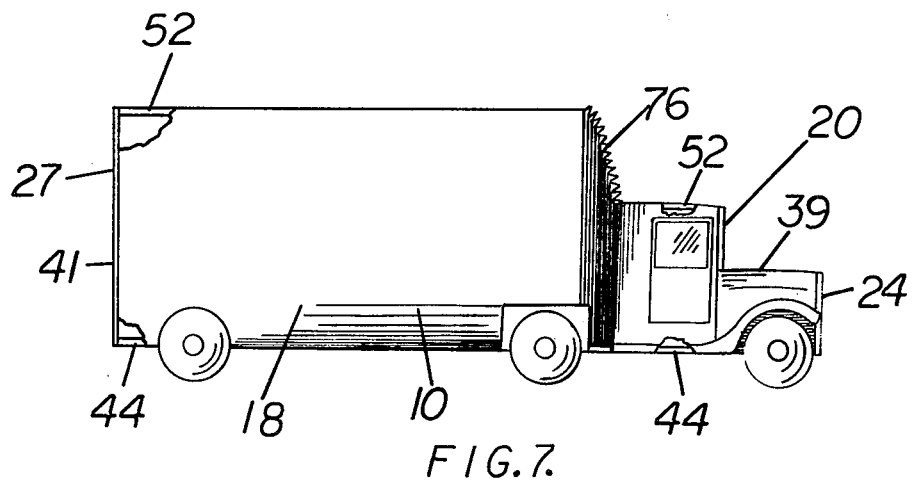
FIG. 7 is a plane view of a preferred embodiment of the invention illustrating a vehicle being articulated along its length.

Although an average passenger vehicle is shown in FIGS. 1-4, it should be understood that the system is also applicable, with modifications, to other types of vehicles such as station wagons, vans, panel trucks, and buses as well as articulated vehicles such as tractor trailer and car trailer combinations as shown in FIGS. 5-7.

Valves (fluidic or mechanical) may be used in the ductwork to maximize the air flow balance under varying conditions of operation. Of course, the ouput ducts are insulated to retain the energy imparted by the engine heat.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A body for a vehicle adapted to increase the fuel efficiency of the vehicle comprising:
   a front end,
   projection means surrounding said front end and extending outwardly therefrom, said projection means being adapted to isolate a high pressure zone in front of said front end when the vehicle is in forward motion,
   a rear end,
   projection means surrounding said rear end and extending outwardly therefrom, said projection means being adapted to isolate a low pressure zone behind said rear end when the vehicle is in forward motion,
   first duct means connecting the high pressure zone at the front end of said vehicle in fluid flow relation to the low pressure zone at the rear end of said vehicle,
   second duct means connecting the high presure zone at the front end of said vehicle in fluid flow relation to the low pressure zone at the rear end of said vehicle whereby in said front zone the pressure is decreased and in said rear zone the pressure is increased thereby reducing the resistance of the air pressure differential and assisting an engine to urge the vehicle forward.

2. The duct system recited in claim 1 further comprising a third duct means extending downwardly from about a midpoint of the high pressure zone,
   the third duct means directing air from said high pressure zone into said first duct.

3. The vehicle recited in claim 1 further comprising a first radiator,
   said first duct means extending from the high pressure zone to the low pressure zone through a space containing said engine rearwardly,
   said first duct enclosing the first radiator whereby heat from said first radiator heats the air and increases air flow in the first duct means.

4. The vehicle recited in claim 1 further comprising a second radiator,
   said second duct means extending from the high pressure zone from a point adjacent the front of the roof rearwardly,
   said second duct enclosing the second radiator whereby heat from the second radiator heats the air and increases the air flow in the second duct means.

5. The vehicle recited in claim 3 further comprising an exhaust pipe, said exhaust pipe extends through said first duct means and adds heat to said air.

6. The vehicle recited in claim 1 further comprising a radiator, an engine and an exhaust pipe located in said first duct means, and said first duct means has heat insulation attached to the outside thereof to prevent the loss of heat added to said air by said radiator, said exhaust pipe and said engine.

7. The automotive vehicle recited in claim 1 further comprising a radiator and a fan located in said first duct means, and said fan has a variable speed drive to adjust the air flow as required by vehicle speed, thermal energy developed, head or tail wind and terrain.

8. The vehicle recited in claim 1 wherein the vehicle is articulated along its length,
   flexible ducts extending between the articulated parts of the vehicle and connecting forward and rearward portions of the first duct means and the second duct means.

9. A body for a vehicle adapted to increase the fuel efficiency of the vehicle comprising:
   a front end having an upper area and a lower area,
   projection means surrounding said front upper area being adapted to isolate an upper high pressure zone in front of said upper area at said front end,
   projection means surrounding said front lower area being adapted to isolate a lower high pressure zone in front of said lower area at said front end,
   a rear end,
   projection means surrounding said rear end being adapted to isolate a low pressure zone behind said rear end,
   first duct means connecting the lower high pressure zone at the front of said vehicle in fluid flow relation to the low pressure zone at the rear end of said vehicle,
   second duct means connecting the upper high pressure zone at the front end of said vehicle in fluid flow relation to the low pressure zone at the rear end of said vehicle, whereby in said front zone the pressure is decreased and in said rear zone the pressure is increased thereby reducing the resistance of the air pressure differential and assisting the engine to urge the vehicle forward.

10. The vehicle recited in claim 9 wherein an exhaust system has an exhaust line which extends through said first duct means in fluid flow relationship to air flowing over an engine and said exhaust system.

11. The vehicle recited in claim 10 wherein said first duct means is connected to said rear area.

12. The vehicle recited in claim 11 wherein said exhaust line extends through said first duct means from said engine that terminates adjacent the exits at the rear of said first duct means.

13. The automotive vehicle recited in claim 9 further comprising a fan located in said first duct means, and said fan has a variable speed drive to adjust the air flow as required by vehicle speed, thermal energy developed, head or tail wind and terrain.

14. The vehicle recited in claim 9 further comprising a first radiator, said first duct means extending from the lower high pressure zone through a space containing said engine rearwardly, said first duct means enclosing the first radiator whereby heat from said first radiator heats the air and increases air flow in the first duct means.

15. The vehicle recited in claim 9 further comprising a second radiator, said second duct means means extending from the upper high pressure zone from a point adjacent the front of the roof rearwardly said second duct means enclosing the second radiator whereby heat from the second radiator heats the air and increases the air flow in the second duct means.

16. A body for a vehicle adapted to increase the fuel efficiency of the vehicle comprising:

a front end having an upper area and a lower area, projection means surrounding said front upper area being adapted to isolate an upper high pressure zone in front of said upper area at said front end, projection means surrounding said front lower area being adapted to isolate a lower high pressure zone in front of said lower area at said front end, a rear end having an upper area and a lower area, projection means surrounding said rear upper area being adapted to isolate a low pressure zone behind said upper area of said rear end, projection means surrounding said rear lower area being adapted to isolate a low pressure zone beind said lower area of said rear end, first duct means connecting the lower high pressure zone at the front of said vehicle in fluid flow relation to the low pressure zone at the rear end of said vehicle, second duct means connecting the upper high pressure zone at the front end of said vehicle in fluid flow relation to the low pressure zone at the rear end of said vehicle, whereby in said front zones the pressure is decreased and in said rear zones the pressure is increased thereby reducing the resistance of the air pressure differential and assisting the engine to urge the vehicle forward.

17. The duct system recited in claim 16 further comprising a third duct means extending downwardly from below said upper area at said front end, the third duct means directing air from said high pressure zone into said first duct means.

18. The vehicle recited in claim 16 further comprising a first radiator, said first duct means extending from said lower high pressure zone through a space containing said engine rearwardly, said first duct enclosing the first radiator whereby heat from said first radiator heats the air and increases air flow in the first duct means.

19. The vehicle recited in claim 16 further comprising a second radiator, said second duct means extending from said upper high pressure zone from a point adjacent the front of the roof rearwardly, said second duct enclosing the second radiator whereby heat from the second radiator heats the air and increases the air flow in the second duct means.

20. The vehicle recited in claim 16 further comprising an exhaust system, said exhaust system has an exhaust line which extends through said first duct means in fluid flow relationship to air flowing over said engine and said exhaust system.

* * * * *